Oct. 10, 1972   W. E. JAVAREY, JR., ET AL   3,697,359
METHOD OF ATTACHING HANDLES TO FILM BAGS
Filed Dec. 29, 1969                                      2 Sheets-Sheet 1
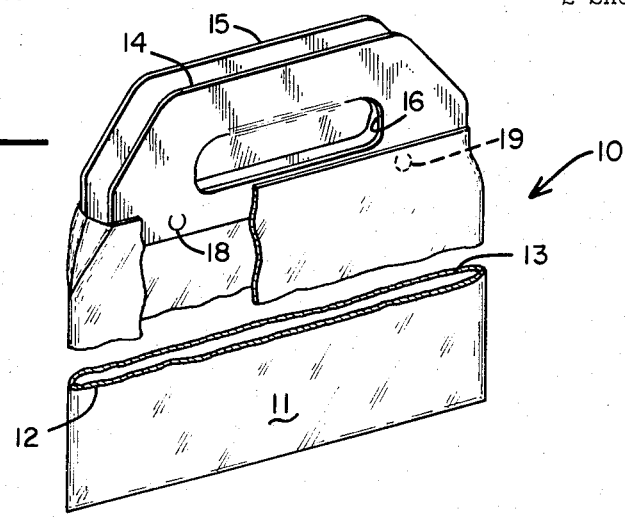
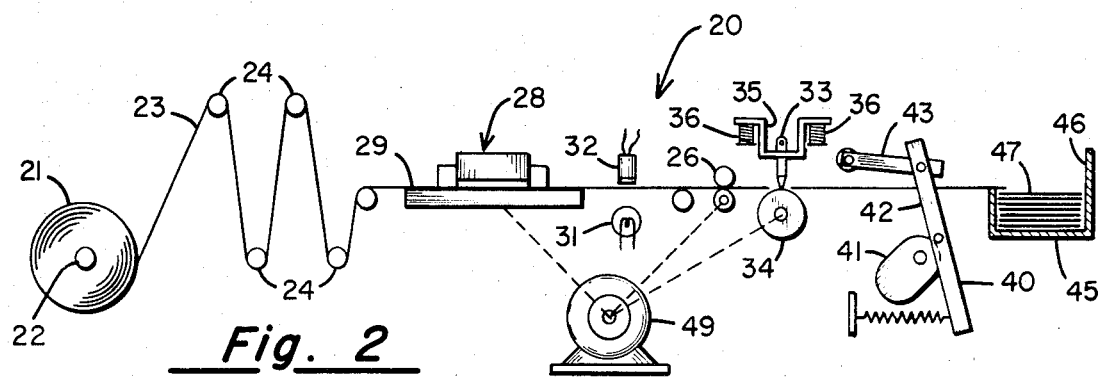
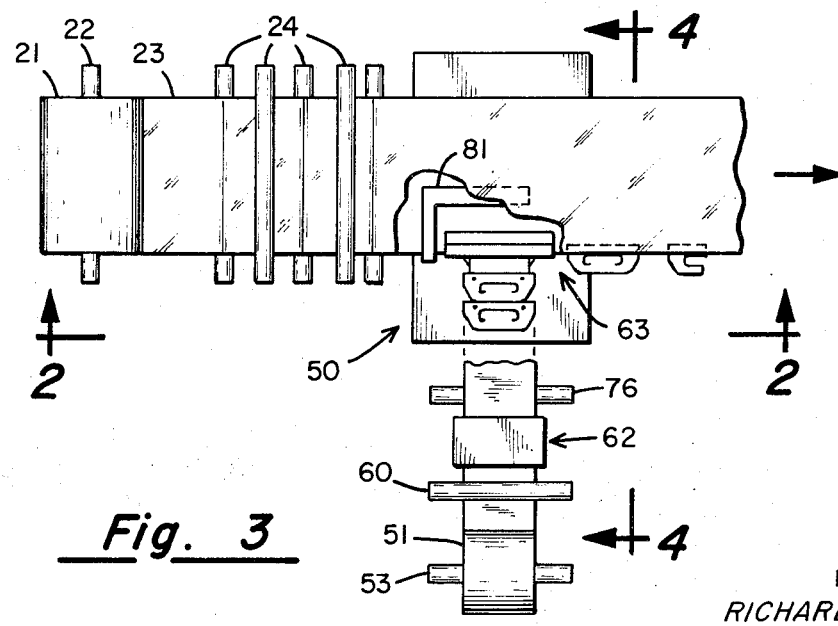
INVENTOR
*RICHARD C. ADAMS*
*WILLIAM E. JAVAREY, JR.*
BY *Chris M. Haugen*
ATTORNEY Oct. 10, 1972　　W. E. JAVAREY, JR., ET AL　　3,697,359
METHOD OF ATTACHING HANDLES TO FILM BAGS
Filed Dec. 29, 1969　　2 Sheets-Sheet 2

INVENTOR
RICHARD C. ADAMS
WILLIAM E. JAVAREY, JR.

BY
ATTORNEY

United States Patent Office 3,697,359
Patented Oct. 10, 1972

3,697,359
METHOD OF ATTACHING HANDLES
TO FILM BAGS
William E. Javarey, Jr., Glocester, and Richard C. Adams, West Barrington, R.I., assignors to G. T. Schjeldahl Company, Northfield, Minn.
Filed Dec. 29, 1969, Ser. No. 888,224
Int. Cl. B32b 31/18, 31/20
U.S. Cl. 156—518
5 Claims

ABSTRACT OF THE DISCLOSURE

Apparatus for bonding a pair of handles from superimposed continuous webs of handle blanks onto the open end of a bag structure formed of flexible heat sealable film, the apparatus comprising web handling means adapted to draw a continuous bag forming web of flexible film onto the upper surface of a web support assembly, and second web handling means adjacent the first web handling means adapted to draw superimposed continuous webs of handle blank pairs along the upper surface of a second web supporting assembly and into predetermined disposition relative to said bag forming retention or web, and means for forming knock-out ears partially through said superimposed handle blanks with the ear in the upper handle blank being retained within the corresponding opening formed in the lower handle blank so as to releasably retain the handle blank pairs in predetermined superimposed relationship for bonding to the continuous web of flexible film.

---

The present invention relates generally to apparatus for forming bags of thin flexible film, and more particularly to apparatus for automatically and continuously heat sealing such handles onto bag stock.

Bags or similar structures formed from thin heat sealable films, such as polyethylene or the like are widely used in commerce. The structure provides an inexpensive, strong, and water-tight enclosure. Since the structures may be reusable by the purchaser, the retailer is encouraged to utilize such a structure for the sale of his product. Bags of this type are accordingly deemed desirable since they are inexpensive and have met with general acceptance.

In order to provide these structures at a reasonable cost, it is essential that they be fabricated automatically and on a substantially continuous basis. The present apparatus provides the handle attaching means as an adjunct to the bag making machine, it being understood that the apparatus will function independently of the bag making machine if desired. In the fabrication operation, the handles are arranged in superimposed relationship on a feed table or surface, and are releasably retained together by virtue of the fabrication of knock-out ears through the handle blank pairs, these handles thereby being held together without requiring a film of adhesive.

Briefly, the present invention utilizes a means for feeding handle blank pairs in superimposed relationship along a feed table or surface disposed adjacent the bag making apparatus. Prior to their being placed in contact with the bag forming film web, and being bonded thereto, punching means are utilized to form a pair of knock-out or retention ears to hold the handle blank pairs in appropriate relative disposition without the need for adhesive bonding.

Briefly, the present invention comprises a means for moving a first web of double-thick polyethylene film across a work-supporting station. Preformed polyethylene coated handle blanks in the form of severable superimposed back-to-back webs are also directed across the work-supporting surface, the handle blanks being brought into the station at right angles to the direction of movement of the film web. With the handle blanks held together by the canted ears, suitably positioned opening means separate the edges of the moving film and maintain the web in this condition while it moves across the work-supporting surface. Timed advance means feed in a pair of handles, and then the handles are severed from the respective webs while substantially simultaneously, heat sealing means secure one handle to each of the layers of the film web. Various adjustment means are, of course, provided in order to accommodate various bag sizes, and also to appropriately synchronize the work.

The present invention is an improvement over the device disclosed in U.S. Pat. 3,392,636, dated July 16, 1968, Donald C. Lindley.

Therefore, it is an object of the present invention to provide an improved apparatus for the preparation of plastic bags with handles, the apparatus providing a means for releasably retaining the handles in appropriate superimposed relationship prior to their being bonded to the plastic film web.

It is a further object of the present invention to provide an improved apparatus for automatically and continually bonding handle blanks to plastic bags, the handle blanks being retained together prior to the bonding operation without the use of adhesive layers.

Other and further objects of the present invention will become apparent to those skilled in the art upon a study of the following specification, appended claims, and accompanying drawings wherein:

FIG. 1 is a perspective view, partially broken away, of a plastic bag having a pair of handles bonded thereto, the handles having been assembled in accordance with the present invention;

FIG. 2 is a schematic elevational view taken generally along the line and in the direction of the arrows 2—2 of FIG. 3, and illustrating the bag forming portion of the present invention;

FIG. 3 is a schematic plan view of the handle attaching apparatus of the present invention, FIG. 3 being on a somewhat enlarged scale;

Figure 4:
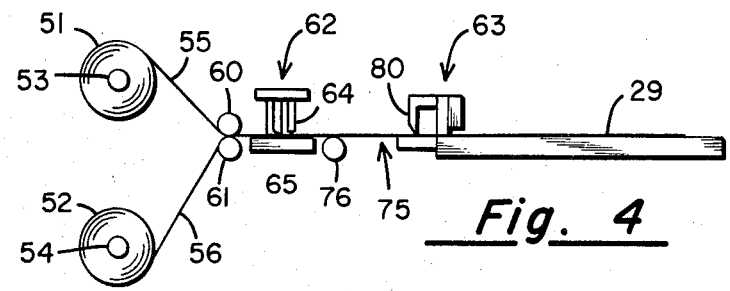
FIG. 4 is a detail elevational view of the handle attaching portion of the present invention, FIG. 4 being taken along the line and in the direction of the arrows 4—4 of FIG. 3.

With particular attention being directed to FIG. 1 of the drawings, the bag structure generally designated 10 includes a bag envelope or the like 11 having major front and rear enclosure surfaces 12 and 13 along with a pair of handles 14 and 15 attached to the bag body 11 at the open end thereof. The handles 14 and 15 are preferably bonded to the bag body by heat sealing techniques, and thus a surface which is compatible with the sealing characteristics of the bag body 11 is to be preferred. When polyethylene is employed as the material of construction for the bag body 11, polyethylene coated paper or polyethylene per se may be employed for the handle means. As is apparent from the view of FIG. 1, an elongated opening is formed in each of the bag handles as at 16 in order to accommodate the hand of the carrier.

As will become more apparent from the discussion hereinbelow, the handles 14 and 15 are also provided with knock-out ears such as are shown at 18 and 19, these knock-out ears being employed to retain the individual handles, while in a web, in proper superimposed relationship. In this connection, these knock-out ears may be employed in lieu of adhesive bonding techniques or the like, thus enhancing the versatility of the bag style when completed. As is apparent in FIG. 1, handles 14 and 15 are spread apart by a short distance, this separation of the handles being accomplished by virtue of the releasable retention being accomplished by the knock-out ears 18 and 19.

Particular attention is now directed to FIG. 2 of the drawings wherein the bag making portion of the device is shown. For example, the apparatus shown generally at 20 includes a supply roll 21 mounted on arbor shaft 22, and delivering a web 23 across a plurality of idlers 24—24, motion of the web being provided by draw rolls 26. The handle attaching portion is shown generally at 28, this portion being provided with a work supporting area 29. A lamp and sensor combination is shown respectively at 31 and 32, this apparatus being employed to synchronize, when necessary, the motion of reciprocating sealing bar 33. The sealing bar 33 operates against back-up roll 34, and, for purposes of stability, is mounted within channel member 35 supported by resilient spring members or the like 36—36. An appropriate pick-off mechanism is utilized, such as is shown at 40, cam 41 being utilized to actuate the linkage arms 42 and 43 for the purposes of picking off finished product from the area of the sealing bar 33. The product is received in an appropriate chamber or bin, such as is shown at 45. The product receiving means is provided with a stop bar as at 46, for purposes of uniformly receiving and stacking the product such as is shown at 47.

In order to appropriately synchronize the motion of the apparatus 20, a single prime mover is preferably employed, such as is shown at 49. This may be in the form of an electric motor, or the like, although other suitable sources of power may be employed as well. It will be appreciated that the problems of synchronization are less whenever a single source of power is utilized for obtaining motion of the various components of the apparatus.

It will be appreciated that the concept of the present invention may be employed with any of a variety of bag-making machines, one typical apparatus being that disclosed in the patent to Kitch, No. 3,351,215 and entitled "Sheet Article Stacker." Apparatus for fabricating bags from polyethylene film are, of course, widely used in industry today.

Figure 6:
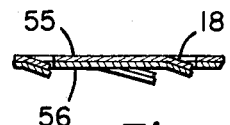
FIG. 6 is a vertical sectional view taken along the line and in the direction of the arrows 6—6 of FIG. 5, and illustrating the disposition of the knock-out ears during the final stages of motion of the handle blank pairs prior to being bonded to the film web.
Figure 7:
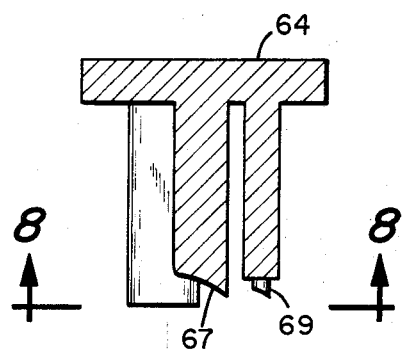
FIG. 7 is a detail vertical sectional view of the die utilized to form the knock-out ears in the handle blanks.
Figure 5:
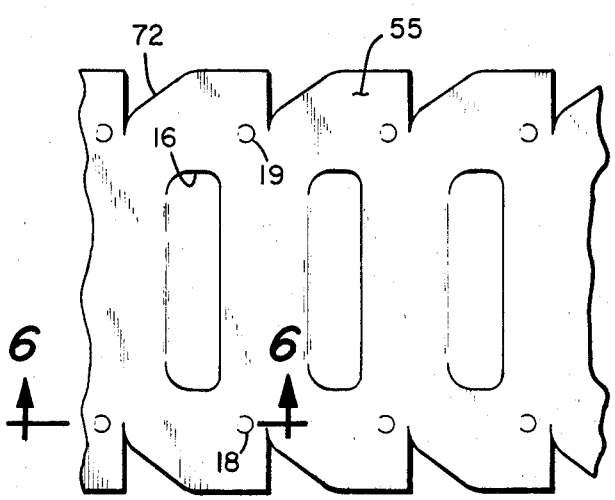
FIG. 5 is a top plan view of the handle blank utilized in connection with the present invention, and illustrating the knock-out ears which extend partially through the handle blank pairs.
Figure 8:
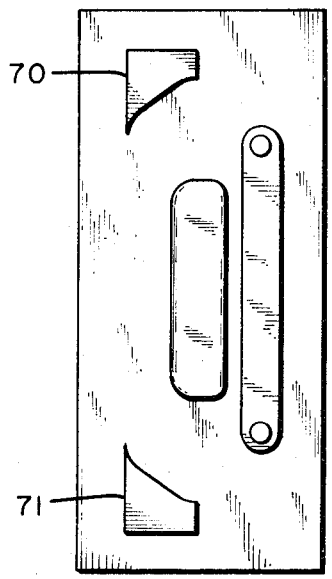
FIG. 8 is a bottom plan view taken along the line and in the direction of the arrows 8—8 of FIG. 7, and showing the features of the die of FIG. 7.

Attention is now directed to FIGS. 3 and 4 of the drawings for a detailed description of the handle attaching portion of the apparatus, this portion being shown generally at 50. The handle attaching portion 50 is provided with a pair of supply rolls 51 and 52 which function from individual shafts 53 and 54, and deliver webs 55 and 56 in superimposed relationship onto the work supporting area 29. The webs are passed between the nip of draw rolls 60 and 61 prior to reaching the die cutting station 62 and the attaching station 63. In this connection, the die cutting station 62 comprises a cooperating die and pad 64 and 65 (FIGS. 7 and 8), die 64 including an elongated aperture cutting face 67 along with a knock-out ear forming member 69. The member 69 is separated from the remaining portion of the blank by a residual zone of substantially 270° of arc, the 90° balance being used as a connecting area. The knock-out ear portion provides an angularly disposed opening in the bag handle, such as is illustrated in FIGS. 5 and 6. If desired, the die 64 may be provided with means for forming a beveled contour for the handle, such as is shown at 70 and 71 in FIG. 8. The relieved portion of the handle is shown at 72 in FIG. 5.

It is important to the proper functioning of the apparatus that the individual webs 55 and 56 be maintained in appropriate superimposed relationship as they pass from the station 62 to the station 63, this span shown generally at 75 in FIG. 4. Suitable conveyor means may be employed to move the web 55 and 56 across this span, such a conveyor employing, for purposes of imparting motion to the webs, a support or drive roll 76. As has been indicated previously, the knock-out ears 18 and 19 provide appropriate means for maintaining or retaining the webs in proper superimposed disposition as they move along this span. The knock-out ear in the upper web 55 is designed so as to extend partially through the lower web 56, such as is shown in FIG. 6. This extension of the knock-out ear provides releasable retention of the webs as they move in this area, this releasable retention being accomplished without the need for application of films of adhesive or the like. Later, when the bag is being treated for filling, or the like, it is not necessary to break the adhesion bond formed by such layers of adhesive, and thus filling operations are simplified and enhanced.

With continued attention being directed to FIG. 4 of the drawings, the sealing station 63 includes a conventional sealing bar such as is shown at 80, this bar being in the form of a heated sealing wheel, or the like if desired. For most purposes, a reciprocating sealing bar or shoe may be employed with equal efficacy. Again, as indicated previously, the function of the sealing mechanism 63 is to attach the bag handles to the film prior to the cut-off operation. For purposes of obtaining separation of the layers forming the film web 23, a L-shaped separator member is illustrated at 81, this separator member being arranged on the surface 29.

For a more detailed description of this segment of the apparatus, reference is made to the patent to Lindley, 3,392,636, as described hereinabove.

Therefore, in accordance with the present invention, a system is provided for releasable retention of individual members of a pair of webs traveling in superimposed relationship from a forming station to a sealing station. The examples provided herein are illustrative of apparatus which may be suitably employed in connection with this arrangement.

What is claimed is:

1. Apparatus for bonding a pair of handles from superimposed continuous rolls of handles onto the open end of a bag structure formed from a continuous web of flexible film, said apparatus comprising:
    (a) first web handling means adapted to draw a continuous bag forming web of flexible film onto the upper surface of a first web supporting assembly;
    (b) second web handling means adjacent said first web handling means adapted to draw superimposed continuous webs of handle blank pairs along the upper surface of a second web supporting assembly and into predetermined disposition relative to and in contact with that portion of said bag forming web which becomes the top of said bag structure;
    (c) means for forming at least one web retention ear through each of said handle blank pairs and extending at least partially through said superimposed handle blank pairs with the ear in the upper handle blank being retained within the corresponding ear opening formed in the lower handle blank and being angularly disposed relative to the plane of said handle pairs so as to releasably retain said blanks in predetemined superimposed relationship.

2. The apparatus as defined in claim 1 being particularly characterized in that means are provided for forming a pair of retention ears through the superimposed handle blank pairs.

3. The apparatus as defined in claim 1 being particularly characterized in that said retention ear is generally arcuately formed with a substantially constant radius and is coupled to said handle blank by an integral coupling zone of substantially 90 degrees of arc.

4. The apapratus as defined in claim 1 being particularly characterized in that means are provided for forming said retention ears along said web at a point immediately prior to contact being established between the handle blank pair and the bag forming web.

5. The apparatus as defined in claim 4 being particularly characterized in that means are provided for heat sealing a pair of handle blank pairs to a web of bag forming flexible film.

References Cited

UNITED STATES PATENTS

| | | | |
|---|---|---|---|
| 3,392,636 | 7/1968 | Lindley | 156—522 |
| 3,455,760 | 7/1969 | Lindley | 156—264 |

BENJAMIN A. BORCHELT, Primary Examiner

J. V. DORAMUS, Assistant Examiner

U.S. Cl. X.R.

156—250